Oct. 27, 1970 R. BERGER 3,535,780

CONTINUOUS PROCESS FOR THE PRODUCTION OF ELECTRICAL CIRCUITS

Filed Oct. 4, 1967

INVENTOR.
RALPH BERGER

BY

Roberts & Cohen
ATTORNEYS

United States Patent Office 3,535,780
Patented Oct. 27, 1970

3,535,780
CONTINUOUS PROCESS FOR THE PRODUCTION OF ELECTRICAL CIRCUITS
Ralph Berger, 73 Graylock Road, Wellesley, Mass. 02181
Filed Oct. 4, 1967, Ser. No. 672,776
Int. Cl. H05k 3/30
U.S. Cl. 29—626 6 Claims

ABSTRACT OF THE DISCLOSURE

Copper strips withdrawn from respective rolls are glued in parallel alignment on fish paper or another suitable vehicle such as plastic, epoxy, etc., also withdrawn from a roll. Holes are punched in the thusly glued strips and self punching eyelets are inserted in selected portions of the strips. Electrical components are soldered to the eyelets, the holes constituting breaks or interruptions in the strips. The thusly formed electrical circuit may be tested and taken up on a drum to form a roll which is severed from the oncoming sheet. The circuit can be tested afterwards if desired. The roll is potted in epoxy. Apparatus is provided for performing the above steps of the process and the product may be in the form of a roll, but alternatively in the form of flat sheets and multi-layer assemblies of the same.

Figures 1, 2:
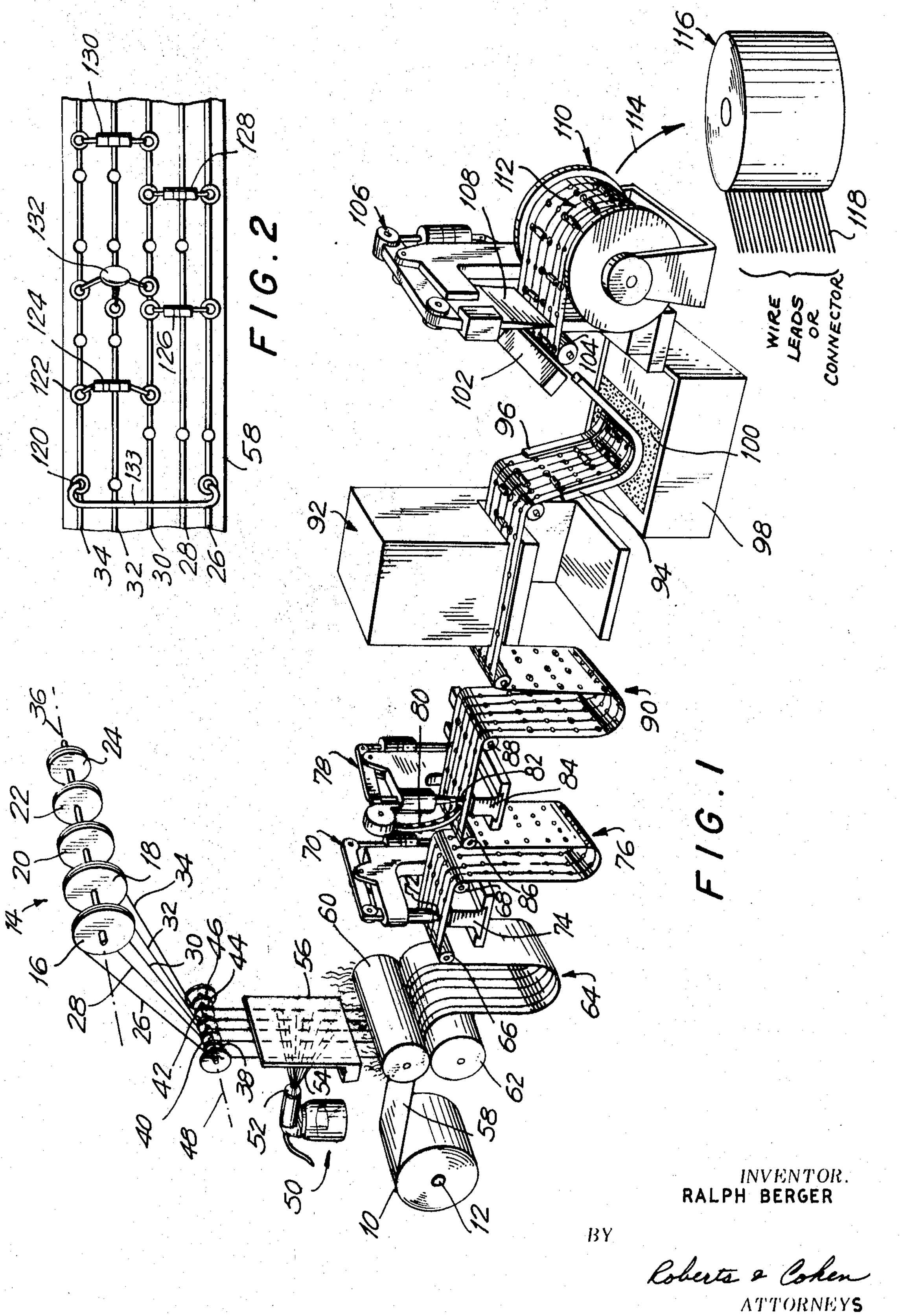

FIG. 1 is a schematic perspective view of an apparatus for fabricating electrical circuits in accordance with preferred embodiment of the invention; and FIG. 2 is a top view of a portion of a sheet upon which operations have been performed in accordance with the aforesaid method.

DETAILED DESCRIPTION

This invention relates to continuous automatic processes for the manufacture of electrical circuits and to apparatus for performing such processes and to products derived therefrom.

It is an object of the invention to provide an automatic and inexpensive method for the manufacture of electrical circuits.

It is another object of the invention to avoid the use of expensive materials such as copper-clad laminates in the production of electrical circuits having the general form and nature of printed circuits.

It is another object of the invention to provide an improved technique for the manufacture of electrical circuits having the form and nature of printed circuits while avoiding the use of complicated chemical processes.

Another object of the invention relates to improved automatic apparatus for the continuous production of electrical circuits.

Yet another object of the invention is to provide an improved electrical circuit which is readily fabricated and which is inexpensive as well as reliable in use.

To achieve the above and other objects of the invention there is proposed a method which comprises continuously applying parallel conductive strips to a sheet and continuously and selectively interrupting these strips according to a circuit plan. Thereafter electrical components are connected with these strips according to the circuit which is to be produced.

According to a feature of the invention, holes are punched into the strips on the sheet to form interruptions therein while eyelets are placed in positions for receiving electrical components, these components being soldered in position so that circuits of a high degree of complexity can be formed.

Another feature of the invention is that the insulating sheet upon which the conductive strips are bonded is supplied from a roll while at the same time the strips themselves are supplied from a plurality of rolls arranged in parallel.

According to one embodiment of the invention, a feature is involved whereby the thusly presented sheet, strips and components are taken up on a drum in the form of a roll and thereafter potted in a plastic to form a compact and shock-resistant unit. Alternatively, it is possible to retain the sheet in planar from which is used individually or in combination with other sheets in a multi-layer arrangement.

The above object and features of the invention will become apparent from the following detailed description of the accompanying drawing, the figures of which have been detailed hereinabove.

In FIG. 1 appears a source 10 of an insulating sheet material which will form the basis of the circuit to be fabricated. This source is preferably in the form of a roll which is rotatable about an axis 12. The sheet material is preferably commercially available fish paper which has sufficient strength to overcome the operations to be described hereunder and which will retain its insulative properties under all conditions to which this material is to be subjected.

The fish paper may vary in thickness between wide limits. However, a range of five to twenty-five thousandths of an inch is to be preferred.

Also indicated in FIG. 1 is a source 14 of conductive material, the source being constituted by spools 16, 18, 20, 22 and 24 of conductive strips 26, 28, 30, 32 and 34. The conductive strips are preferably of copper having a thickness which can vary within a fairly wide range but preferably having a thickness lying within the range of from two to ten-thousands of an inch.

The spools are arranged in parallel and rotate about a common axis 36. The strips of conductive material pass around guide rollers 38, 40, 42, 44 and 46 having a common axis 48 of rotation.

A source of glue or other bonding material is indicated at 50. It consists of a spray gun having a nozzle 52 directing a spray of adhesive material 54 against the aforesaid conductive strips, there being provided a baffle 56 to resrtict the distribution of the adhesive. A wide variety of adhesives can be used inasmuch as the retaining in position of the strips will be augmented by a further process as will be seen hereinafter. However, it is preferred that a heat curable adhesive be employed such as for example various types of epoxy, phenolic and phenoxy resins.

A sheet 58 of insulative material is drawn from the roll 10 along with the individual strips of conductive material by means of driven rollers 60 and 62 which rotate at a rate controlled by the remainder of the process. The rollers 60 and 62 are preferably heated such as, for example, by electric elements in known manner to provide a temperature sufficient to cure the aforesaid adhesive and thus bond the conductive strips to the sheet 58 which may now be considered as constituting an elongated body whose purpose is to support the conductive strips.

Preferably, a loop 64 is formed in the thusly combined sheet and strips to avoid interference with the next succeeding operation, the speed of which operation is controlled by driven rollers 66 and 68.

The next subsequent operation to be performed is that of puching holes through the strips and sheets according to a programmed pattern corresponding to a circuit plan and for this purpose a punch 70 is provided which is controlled by a programmed computer control (not shown) which may be any one of a wide variety of commercially available installations. For operations that are duplicated in big quantities, a fixed punching die may be used eliminating the need for programming.

The holes punched in the strips are intended to perform two purposes as will hereinafter become apparent. These purposes are generally to provide interruptions or breaks in the strips according to a circuit plan.

In any event, the punch 70 comprises a conventional punch 72 and die 74 within which die are provided openings which serve to accommodate the punch mechanism 72 when a hole is to be punched.

It is to be understood that while a single punch mechanism 72 is illustrated for purposes of clarity, a tier of punch elements can be provided which are selectively actuated.

After passing over the roller 68, the sheet 58 has formed therein a loop 76 such that the speed of operation of the punch will not affect the speed of the next sequential operation.

The next sequential operation is constituted by an eyeletting step effected by means of a conventional and commercially available eyeletting machine 78 which feeds a band 80 of eyelets to an operating position beneath the eyeletting mechanism 82. The eyeletting apparatus 78 is also controlled by a programmed computer of commercially available type such that self-punching eyelets are inserted in the sheet 58 in electrical contact with the strips. It will be noted that the eyeletting machine 78 is also provided with a die indicated at 84 to permit the eyeletting function to be performed. A fixed eyeletting pattern may be used eliminating programming.

The sheet 58 is driven through the eyeletting step by means of rollers 86 and 88 which control the speed of the operation in accordance with the programmed insertion of the eyelets.

Although it is not believed necessary to present a detailed explanation of the eyeletting operation to those skilled in the art concerned, it should be noted that a photoelectric inspection of the holes can be provided in order to generate a hole count which is transmitted to an associated computer which compares the hole count with a programmed listing of holes to be eyeletted so that a convenient and efficient method of eyeletting the proper holes results. Sprocket or edge holes may be also used for control and transport.

After passing from the eyeletting machine 78 the sheet 58 has a loop 90 formed therein to avoid once again that the speed of one step of the process might interfere with the proper continuing of the next sequential step.

This next sequential step of the process involves inserting into the eyelets electric components including, for example, resistors, capacitors, coils, jumpers, antennae, delay lines and the like. Each of these components is provided with leads which can be inserted manually but which are preferably automatically inserted by the apparatus indicated generally at 92, this apparatus being constituted by any commercially available type of machine capable of inserting rigid leads through an eyelet. The machine 92 is controlled by a programmed computer means which responds to an eyelet count in each strip to determine the nature of the components to be inserted in particular of the eyelets.

The machine 92 will insert the components into the various eyelets all from the upper side of the sheet 58. The sheet 58 is thereafter passed by means of guides 94 and 96 to a wave soldering apparatus 98 by means of which the bottom side of the sheet 58 is shallowly immersed in solder bath 100. The operation conventionally and automatically solders the electrical components to the corresponding and respective eyelets whereupon the sheet 58 is guided upwardly to a test station 102. The test station 102 includes means (not shown) for making punch contact with the various strips and components so that a programmed testing of the thusly wired circuit can be readily achieved.

After being tested the circuit passes over a driven roller 104 through a shearing station comprising an automatic shear 106 whose blade 108 cuts off the sheet 58 after a predetermined amount of such sheet has passed through this station.

In accordance with a preferred embodiment of the invention, a take-up drum or roller 110 is provided by means of which the sheet 58 is rolled into convolute form 112, this roller constituting generally a complete circuit of the desired circuit plan. The rolled circuit is then moved as indicated by arrow 114 to the final step which constitutes potting the rolled circuit in epoxy to form a finished product having excellent resistance to shock and vibration. This product is indicated generally at 116 and may be provided with a plurality of leads 118 which are connected to the conductive strips on sheet 58 to provide for the connection of this rolled circuit with other circuits with which it is to cooperate.

While the finished product has been indicated in the form of a rolled circuit, it is also possible to omit the take-up drum 110 and to shear the formed circuits into equal or unequal lengths of sheets each constituting an individual circuit. It is also possible in accordance with the invention to use such sheets in a multiple-layer arrangement bonded together by means of an epoxy resin.

An example of the aforesaid insulating sheet with conductive strips bonded thereto and provided with holes, eyelets and components in accordance with the invention, appears in FIG. 2. In FIG. 2 is seen the sheet 58 with strips 26, 28, 30, 32 and 34 bonded thereto. A plurality of holes 120 are formed therein and the aforesaid metallic eyelets 122 are inserted in selected portions of the sheet. Between pairs of these eyelets are connected, by way of example, resistors 124, 126, 128 and 130 and a button capacitor 132 and wire jumpers (see, for example, jumper 133). Starting with the hole in the left hand extremity of strip 34 it is seen, for example, that the circuit has a path along strip 34 through an eyelet 122 and a resistor 124 to the strip 130 and thence via a resistor 126 to the strip 26. Thereafter the circuit path continues to resistor 128 and thence to strip 30 and thereafter the circuit path follows strip 30 to resistor 130 which is connected back to the strip 34. Finally, it will be seen that the button capacitor 132 is connected to eyelets joined with strips 30, 32 and 34. This circuit is not intended to constitute an operative circuit but is merely given by way of illustration as to how a relatively complex circuit can be fabricated in accordance with the invention.

From what has been stated above, it is seen that the method of the invention comprises continuously applying parallel conductive strips to a sheet continuously and selectively interrupting said strips according to a circuit plan and continuously and selectively connecting electrical components with these strips according to this circuit plan.

There will now be obvious to those skilled in the art many modifications and variations of the method, apparatus and products noted hereinabove. These modifications and variations will not depart from the scope of the invention if defined by the following claims.

What is claimed is:

1. A method comprising continuously bonding parallel conductive strips to a sheet, continuously and selectively punching holes through the strips on the sheet, eyeletting selected of the holes along said strips, the punching and eyeletting being effected according to an electrical-circuit plan, inserting electrical components into the thusly applied eyelets, and soldering said components to the eyelets, the remainder of the holes constituting interruptions in the related strips.

2. A method as claimed in claim 1, wherein the sheet is continuously supplied from a roll of flexible insulative material and the strips are continuously supplied from rolls of metal strips, said method further comprising gluing the strips to said material.

3. A method as claimed in claim 2, wherein said components are all applied to one side of said sheet and and wherein the components are soldered by dipping the other side of the sheet into a solder bath.

4. A method as claimed in claim 3 comprising taking up the thusly processed sheet on a roller to form a rolled circuit and potting the rolled circuit in a plastic.

5. A method as claimed in claim 4 comprising continuously testing the circuit between the soldering and rolling steps and forming loops in the sheet between the gluing, punching and eyeletting steps and between the latter step and the step in which the components are inserted, said method further comprising severing the sheet with the strips and components thereon when a predetermined amount of sheet has been taken up on said roller.

6. A method as claimed in claim 5, wherein the sheet is fish paper and the strip is copper, the bonding being effected with a heat-durable glue, said method further comprising passing the sheet with the strips thereon between heated rollers, and connecting leads to said strips and components.

References Cited

UNITED STATES PATENTS

| | | | |
|---|---|---|---|
| 2,613,252 | 10/1952 | Heidel. | |
| 3,157,733 | 11/1964 | De Masi. | |
| 3,317,287 | 5/1967 | Caracciolo. | |
| 3,431,350 | 3/1969 | Haberecht | 174—68.5 |

FOREIGN PATENTS

| | | |
|---|---|---|
| 872,748 | 7/1961 | Great Britain. |

JOHN F. CAMPBELL, Primary Examiner

R. W. CHURCH, Assistant Examiner

U.S. Cl. X.R.

29—33, 203, 211, 429, 430, 473.5; 174—68.5; 317—101